Patented Mar. 20, 1951

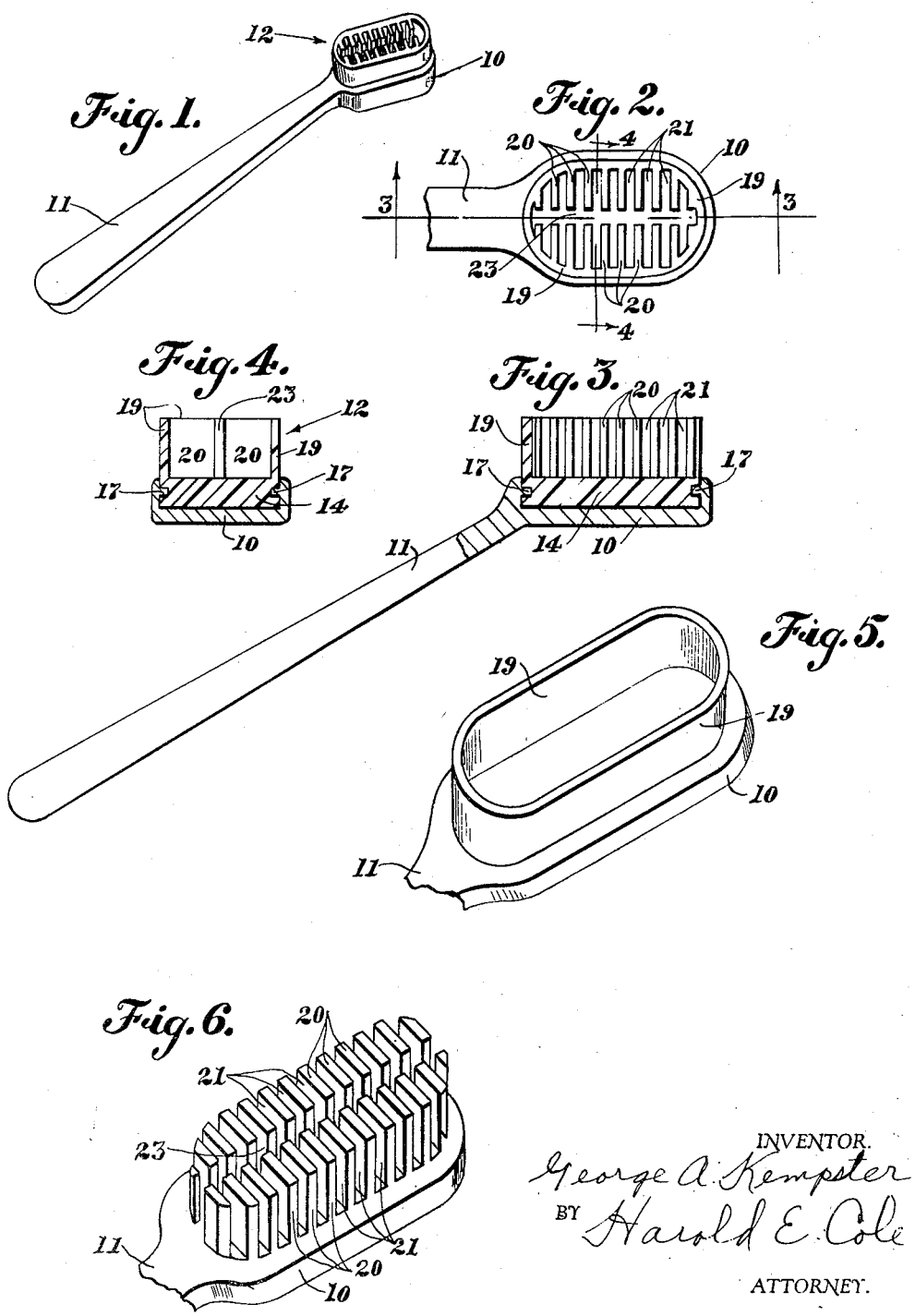

2,545,814

UNITED STATES PATENT OFFICE 2,545,814

DEVICE FOR TREATING TEETH AND GUMS

George A. Kempster, Ashland, Mass.

Application September 15, 1945, Serial No. 616,531

3 Claims. (Cl. 15—188)

This invention relates to a device for treating teeth and gums.

The principal object of my invention is to provide improvements in the aforesaid device that furnish a better means for cleaning and polishing the teeth, and treating the gums, than any heretofore known.

Another object is to provide a vessel to retain tooth paste, liquid, or the like, with tines so positioned that they most effectively apply the paste or liquid to the teeth and gums. The endless peripheral border of the vessel further allows for a peripheral seal so that when in contact with the teeth and gums the medicinal liquid may be forced between the natural interspaces of one's teeth and under the free margins of the gums.

A further object is to make the handle extend at such an angle to the applicator that it will be easy and natural to properly apply my device to the teeth; but unnatural and difficult to improperly use it. It assures use in such a manner that the working surface of the applicator will be at a right angle to the majority of the tooth surfaces being treated.

The foregoing and other objects which will appear as the nature of the invention is better understood, may be accomplished by a construction such as is disclosed by the drawings and specification. The nature of the invention is such as to render it susceptible to changes and modifications, and therefore, I am not to be limited to said disclosure; but am entitled to all such changes therefrom as fall within the scope of my claims.

In the drawings:

Figure 1 is a perspective view of my device for cleaning and polishing teeth.

Figure 2 is an enlarged plan view of said device, the handle broken away.

Figure 3 is a sectional view taken on the line 3—3 of Figure 2, showing the handle full length.

Figure 4 is a sectional view taken on the line 4—4 of Figure 2.

Figure 5 is a perspective view of a modified form of my device with the handle broken away.

Figure 6 is a perspective view of a modified form of my device with the handle broken away.

As illustrated, the supporting means of my device consists of a holder portion 10 and a handle portion 11 made of plastic or other commonly used material. In said holder 10 the applicator portion 12 of my device is set, which applicator 12 has a base portion 14 preferably made of hard rubber or other firm material and an oblong-shaped, enclosed portion or vessel above it preferably made of soft rubber or other flexible material, and later described. The upper surface of said base 14 serves as a bottom for said vessel. Said base has a groove 17 therein extending all the way around into which a projecting portion of said holder portion 10 extends to firmly hold my applicator 12 in place.

Said vessel is formed by an endless enclosure wall 19, from opposite sides of which extend two rows of blades or tines 20 in a lateral direction, which are spaced apart as at 21 and which are of such length that there is a longitudinally extending space 23 between the end extremities of each row of said tines 20. While I show eight tines 20 in each row the number may be varied depending in part upon the desired size of the applicator 12. These tines 20 preferably extend from and are integral with the bottom of said vessel as well as laterally from said enclosure wall 19. Said spaces 21 and 23 will accommodate an ample supply of tooth paste, liquid or other material in said vessel 15. Said wall 19 need not be higher than ⅛ inch.

Said handle portion 11 preferably extends straight outwardly and rearwardly from said base portion 14 at an angle therefrom of between 25 and 35 degrees, preferably 30 degrees, as illustrated in Figure 3 of the drawings. Said angular handle 11 makes it possible to achieve an easy, natural, rotary and an up-and-down motion of the said applicator to the facial, palatal or lingual surfaces of one's teeth, also a back and forth motion when applied to the occlusal or morsal surfaces of one's teeth, and provides a handle for exerting a mild pressure on the applicator for forcing medicinal preparations between the teeth and under the free margins of the gums.

In Figure 5 of the drawings I show a said vessel without any said tines 20. In this construction the paste, or other cleaning and polishing or treatment material, is placed in said vessel and said wall portion 19, which is flexible, but durable, is rubbed or forced against the teeth and gums. This construction enables one to use a larger quantity of said material and bring more of it directly into contact with the teeth.

In Figure 6 of the drawings an applicator portion 12 is shown without said vessel forming wall 19. Said tines 20 extend upwardly from the top surface of the base set in said holder portion 10.

Said tines 20 are illustrated as oblong-shaped because this is desirable form, but they could be round or square in cross-section and serve the purpose.

Said tines 20 are effective even though they do not extend directly opposite each other from opposite wall portions 19, but I prefer the positioning of them opposite each other as shown in Figure 2 of the drawings. Said wall 19 is so formed as to enclose an oval-shaped vessel which is a preferred form; but other shapes of vessels would be more or less suitable.

What I claim is:

1. A device of the class described comprising supporting means embodying a base portion, a vessel embodying and bounded by an oval-shaped wall supported by said supporting means, a bottom for said vessel from which said wall extends outwardly, a plurality of more than four tines spaced apart extending laterally from each of opposite sides of said wall towards and directly opposite each other, the extremities of said tines at opposite sides being spaced apart laterally whereby there is a space extending longitudinally of said vessel, said tines at the longitudinal extremities of said wall being shorter than the tines at an intermediate portion thereof.

2. A device of the class described comprising supporting means, an open vessel embodying and bounded by a wall supported by said supporting means, and tines spaced apart and extending laterally from two opposite sides of said wall inwardly beyond the border of said wall and towards each other to a point where they are spaced from the longitudinal axial line of said vessel, said tines extending laterally such a distance that they occupy more than one-half the interior space of said vessel excepting the spaces between them.

3. A device of the class described comprising supporting means, an open vessel embodying and bounded by a wall supported by said supporting means, and tines spaced apart and extending laterally from two opposite sides of said wall inwardly beyond the border of said wall and towards each other to a point where they are spaced from the longitudinal axial line of said vessel, the majority of said tines extending laterally a greater distance than the width of said space.

GEORGE A. KEMPSTER.

REFERENCES CITED

The following references are of record in the file of this patent:

UNITED STATES PATENTS

| Number | Name | Date |
|---|---|---|
| 128,840 | Allerton | July 9, 1872 |
| 411,910 | Van Horne | Oct. 1, 1889 |
| 2,042,239 | Planding | May 26, 1936 |
| 2,059,914 | Rosenberg | Nov. 3, 1936 |
| 2,153,554 | Fitzgerald | Apr. 11, 1939 |
| 2,154,846 | Heymann et al. | Apr. 18, 1939 |
| 2,244,699 | Hosey | June 10, 1941 |